July 29, 1952     E. N. BRODEN     2,604,692
BUSHING INSERTING MACHINE

Filed Nov. 13, 1946     6 Sheets—Sheet 1

INVENTOR
EDWIN N. BRODEN
BY
Ely & Frye
ATTORNEYS

July 29, 1952 E. N. BRODEN 2,604,692
BUSHING INSERTING MACHINE
Filed Nov. 13, 1946 6 Sheets-Sheet 2

INVENTOR
EDWIN N. BRODEN
BY Ely & Frye
ATTORNEYS

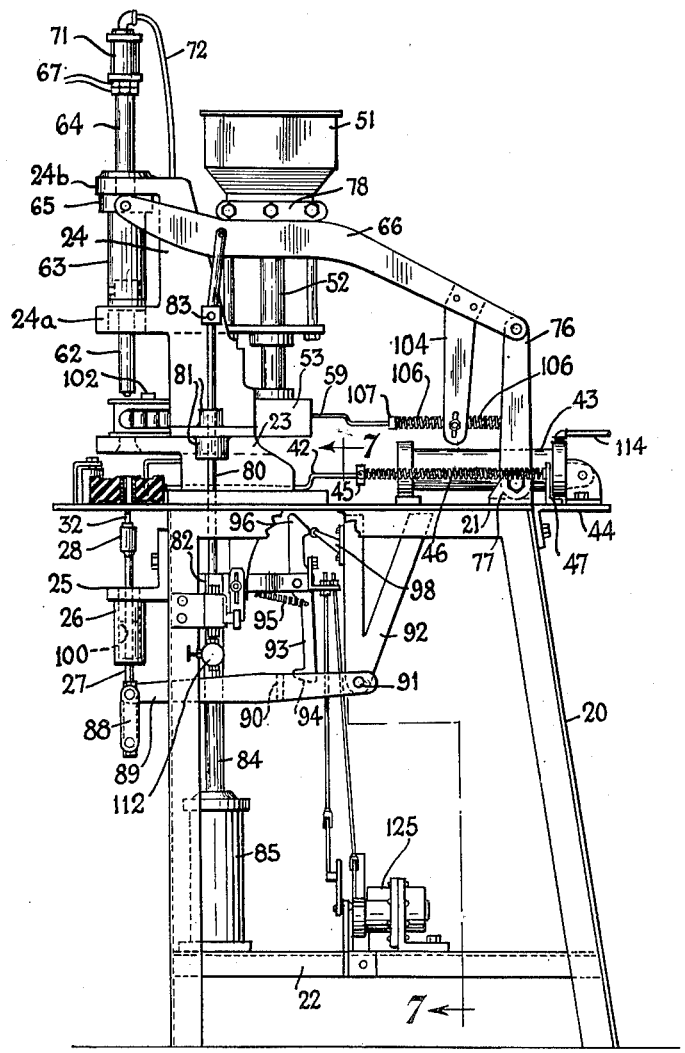

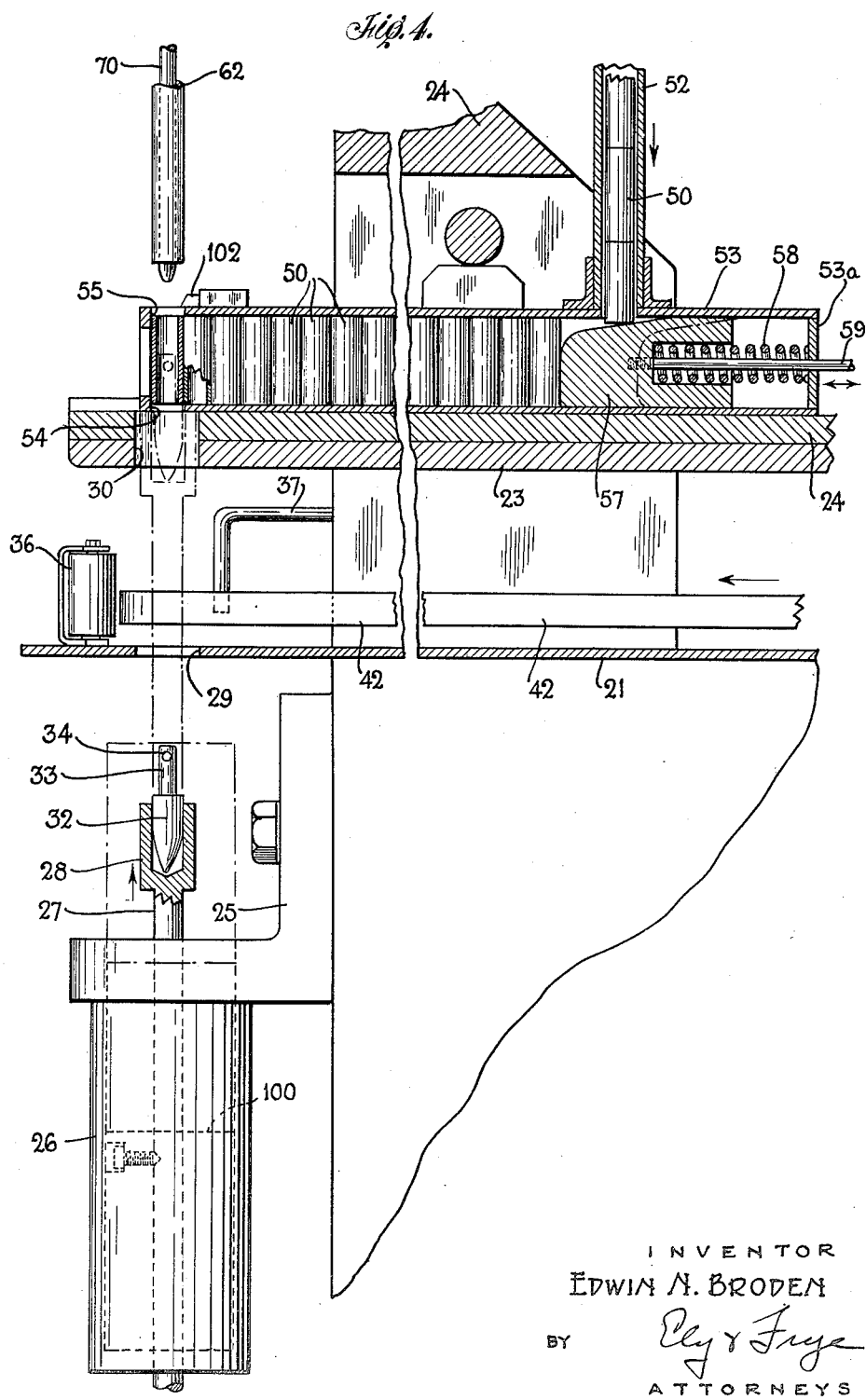

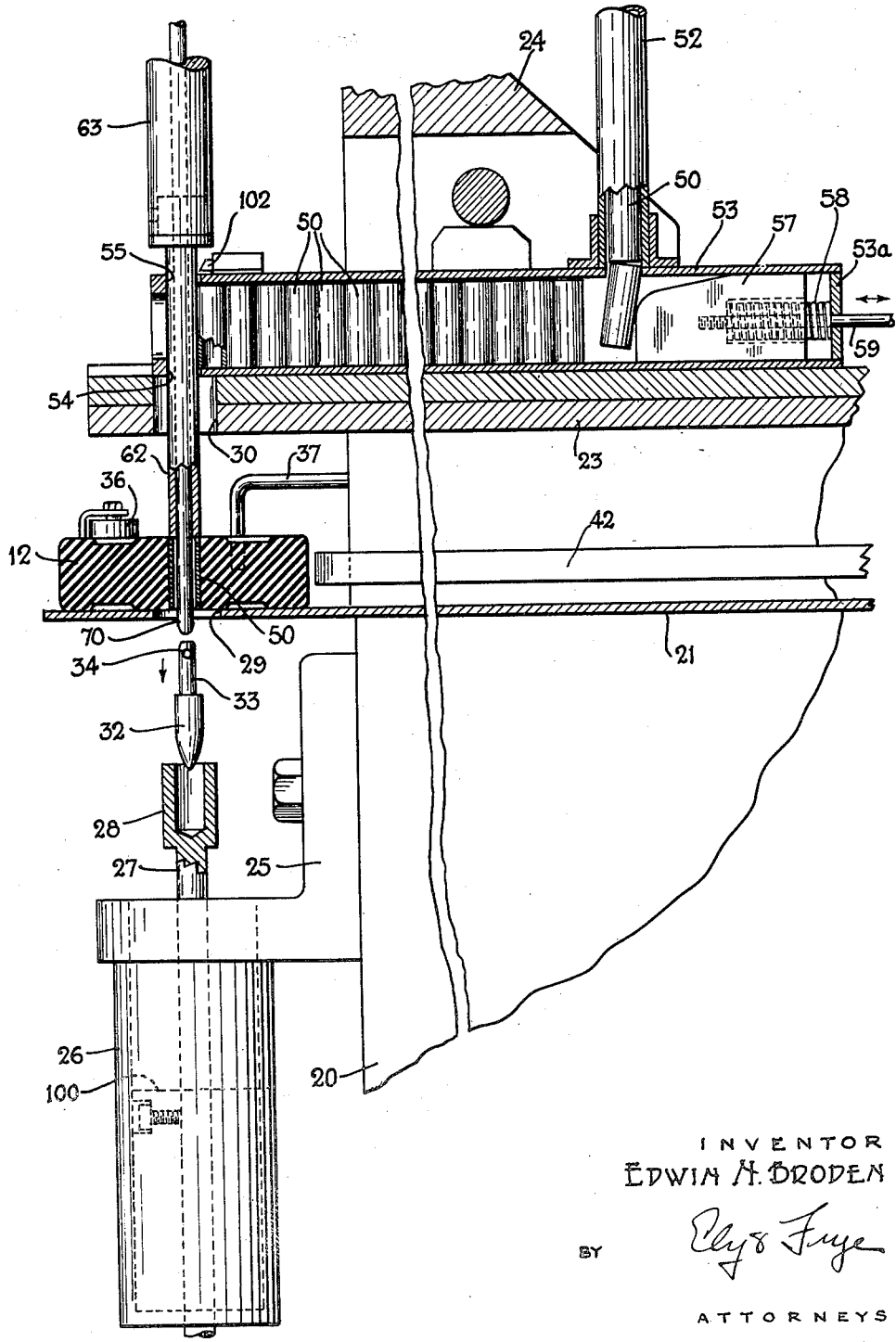

July 29, 1952 E. N. BRODEN 2,604,692
BUSHING INSERTING MACHINE
Filed Nov. 13, 1946 6 Sheets-Sheet 6

INVENTOR
EDWIN N. BRODEN
BY
ATTORNEYS

Patented July 29, 1952

2,604,692

UNITED STATES PATENT OFFICE 2,604,692

BUSHING INSERTING MACHINE

Edwin N. Broden, Assonet, Mass., assignor to The Firestone Tire & Rubber Company, Akron, Ohio, a corporation of Ohio Application November 13, 1946, Serial No. 709,610

3 Claims. (Cl. 29—208)

This invention relates to bushing inserting machines, and more especially it relates to apparatus for automatically mounting metallic bushings in a continuous succession of molded non-metallic articles.

The apparatus is of especial utility for mounting tubular metallic bushings or bearings in small wheels or casters, the latter being composed of molded rubber or rubber-like composition. The article initially is manufactured with an axial aperture that is smaller in diameter than the bushing that is to be received therein, so that the article requires to be softened by heat, before the bushing-inserting operation, to enable entry of the bushing by slight deformation of the composition of the article. Upon cooling, contraction of the composition of the article firmly holds the bushing in place.

The chief objects of the invention are to provide in an improved manner, for the insertion of tubular bushings into apertured articles; to provide in a simple manner for stretching or enlarging the axial apertures of the articles immediately preceding the entry of the bushings into said apertures; and in general to effect economies in the manufacture of articles of the character mentioned. Other objects will be manifest as the description proceeds.

Of the accompanying drawings:

Fig. 3 is a side elevation of the machine, the hopper and feed chute for the molded articles being omitted;

Fig. 4 is a sectional detail view, on a larger scale, through the work-engaging portion of the apparatus, and the bushings to be mounted in the articles, the view showing how a pilot member is mounted in a bushing;

Fig. 5 is a view of the parts shown in Fig. 4 at a subsequent phase of operation, showing the ejection of the pilot from a bushing after the latter is mounted in an article;

Figure 1:
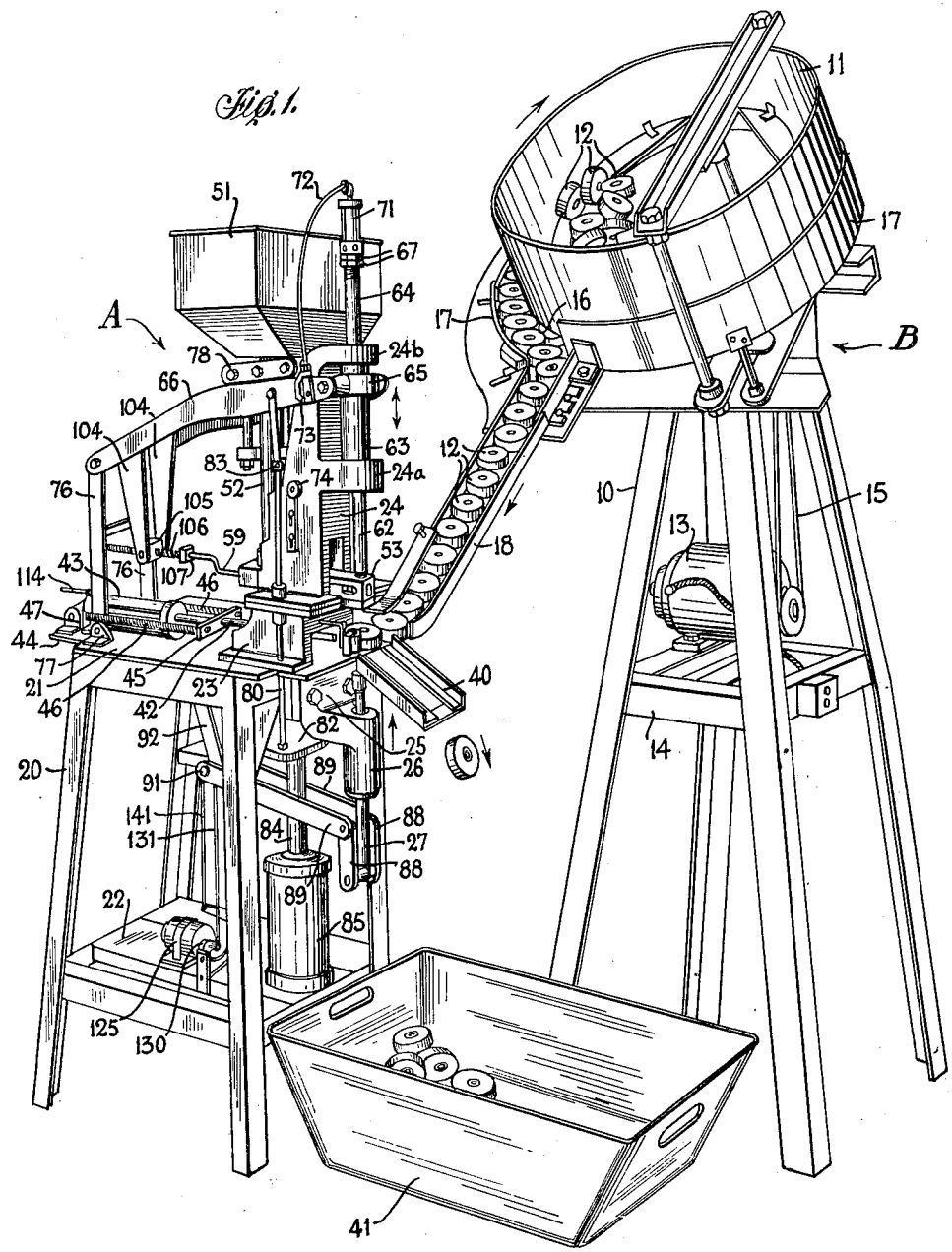
Fig. 1 is a perspective view of the entire machine of the invention.
Figure 2:
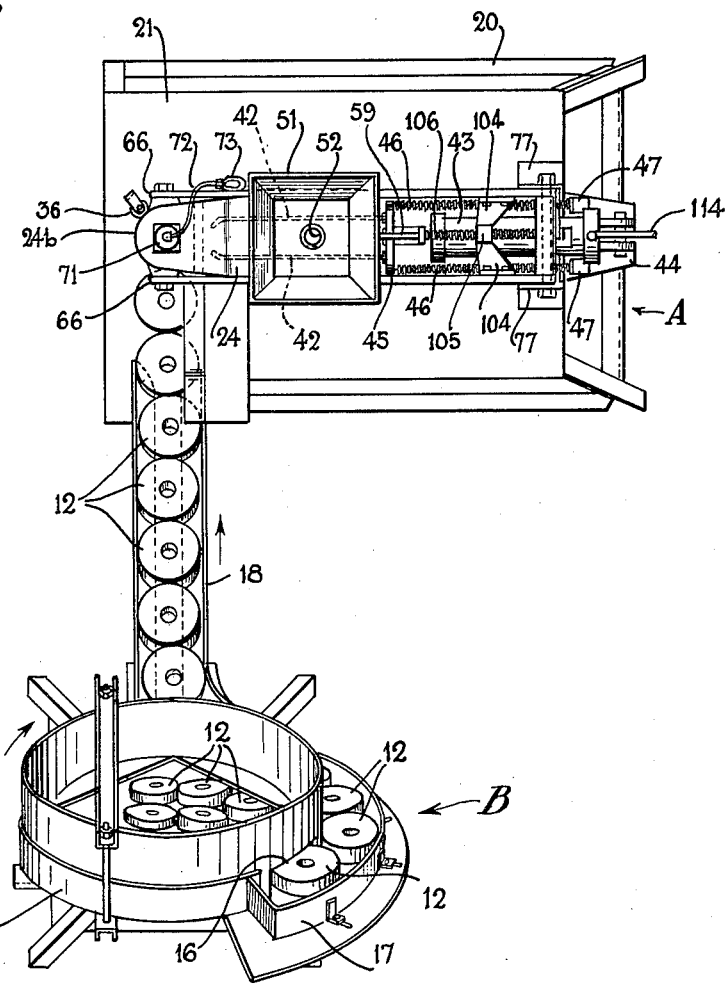
Fig. 2 is a plan view thereof.

Referring first to Figs. 1 and 2, it will be seen that the machine of the invention comprises two units, namely, an apparatus A for inserting tubular bushings within the apertures of apertured articles, and an apparatus B for feeding a continuous succession of said apertured articles to a determinate position upon the apparatus A. Said apparatus B comprises a table-like standard 10 upon the top of which is a rotary hopper 11, said hopper being disposed on an inclined plane that slopes toward the apparatus A. The hopper 11 is adapted to receive a multiplicity of axially apertured discs 12, 12 that constitute a part of the work. An electric motor 13 is mounted upon a suitable shelf 14 below the hopper, and drives the latter in the direction indicated by arrows in Figs. 1 and 2, by means of a transmission belt 15. The work-pieces 12 are received in the hopper in chance arrangement, and rotation thereof discharges the work-pieces therefrom through slots 16 in the wall of the hopper at the bottom thereof. Outside the hopper 11 is an arcuate guide-plate 17 that fits close about the hopper throughout the major portion of the periphery of the hopper, and is spaced from the hopper the remainder of the distance about the same. Extending obliquely downwardly from the standard top is a laterally flanged inclined chute 18, the bottom of which is properly located to discharge work-pieces 12 therefrom to the bushing-inserting apparatus A, in position to be operated upon by the latter as presently will be explained. That portion of the guide-plate 17 that is spaced from the hopper-wall is adjustable relatively of the latter so that articles of various diameters may be processed. At its lowest point the guide plate 17 merges with one of the lateral flanges of the chute 18. No invention is claimed for the work-feeding apparatus B, so that a more detailed description thereof is thought not to be necessary.

The machine that constitutes apparatus A comprises a table-like standard 20 having a flat top plate 21, and having a shelf structure 22 located substantially below said top plate, said top plate overhanging the standard at the front thereof. Mounted upon the top plate 21, adjacent the front thereof, is a bridge-like supporting structure 23, and superposed upon the latter is an upright bracket-like structure 24. Mounted upon the front of standard 20, below the overhanging portion of top plate 21, is a bracket 25 formed with a bearing portion 26 in which a vertically positioned spindle 27 is slidably mounted for reciprocatory movement, the upper end of said spindle being formed with a cup-like receptacle 28. The overhanging portion of top plate 21 is formed with an aperture 29 that is in axial alignment with the spindle 27, and of such diameter that the receptacle 28 readily may pass therethrough. The supporting structure 23 and the bracket-like structure 24 also have portions contiguous with each other that overhang the standard 20 at the front thereof, somewhat above the top plate 21, and said contiguous overhanging portions are formed with a through aperture 30 of the same diameter as the aperture 29 and in axial alignment therewith, as best shown in Figs. 4 and 5.

Receivable within the receptable 28 is a pilot 32 that has a body portion of ogival shape. The nose of the pilot is directed downwardly, the length of the pilot being such that it projects slightly above the top of the receptacle. An axial stem 33 of reduced diameter projects upwardly from the pilot, said stem having a spring-pressed ball detent 34 projecting from the side thereof. The function of the pilot 32 and the means for vertically reciprocating the spindle 27 subsequently will be described.

The station at which metallic bushings are mounted in the molded, apertured discs 12 is located upon the forwardly overhanging portion of top plate 21, concentrically of the axis of aperture 29 therein. The discs 12 move by gravity in single file down the chute 18 and onto top plate 21, the discs on the plate being urged thereover by the static weight of the discs in the chute, as shown in Figs. 1 and 2. For positioning the lowermost disc 12 of the file thereof accurately in position to be operated upon, abutment members 36, 37 are provided of which 36 is a roller pivoted on a vertical axis on the plate 21 and 37 is an angular arm supported by the supporting structure 23 and projecting therefrom. Said abutment members engage the perimeter of the lowermost disc 12 on the leading side thereof, and position said disc with its central aperture substantially in axial alignment with aperture 29 in top plate 21.

After a bushing is mounted in a molded disc 12 at the station just described, the disc with bushing therein is ejected from the apparatus by being pushed laterally from the file of discs, the ejected disc falling from the top plate 21 into a short chute 40 at the front of the apparatus A, which chute discharges into a suitable pan or receptacle 41. For so ejecting a disc 12, a pair of reciprocable push rods 42 are provided, which push rods extend in fore-and-aft direction and are offset laterally from the fore-and-aft centerline of the apparatus, as indicated in broken lines in Fig. 2. At their rear ends the push rods 42 are connected to a yoke 45 mounted upon the outer end of the piston rod of a single-acting fluid pressure operated cylinder 43, so as to constitute, in effect, extensions of said piston rod, said cylinder 43 being mounted upon the top plate 21 and a bracket 44 secured to standard 20, at the rear of said top plate. The cylinder 43 is chargeable at its rear end so as to project its piston rod and the rods 42 forwardly from the position shown in Figs. 1, 2, 3, and 5 to the position shown in Fig. 4. For retracting the piston and the rods 42, as the cylinder 43 is discharged, the yoke 45 is connected to one end of a pair of tension springs 46 that are connected at their other ends to respective fixed brackets 47 located near the rear of cylinder 43. The arrangement is such that when the push rods 42 are projected to eject a disc 12 from the lower end of the file thereof, the said push rods pass laterally of the aperture 29 in top plate 21, on opposite sides thereof. Thus the push rods not only serve to eject an assembled disc, but by remaining stationary in their projected position, prevent the succeeding disc 12 from moving into the assembling station, coaxially of the aperture 29, until after said aperture has been utilized by another instrumentality to perform a function presently to be explained. Means by which the cylinder 43 is operated in determinate time relation to other instrumentalities of the apparatus subsequently to be described.

The metallic bushings that are inserted in the axial apertures of the discs 12 are tubular structures that are essentially of the same length as the thickness of the discs. Said bushings, which are designated 50, are received in the apparatus, in chance arrangement, within a vertically vibratory hopper 51 located at an elevated position on the apparatus A, said hopper being slidably mounted upon a tubular guide and discharge chute 52 that opens into the bottom of the hopper, and down which the bushings 50 move by gravity, one on top of another, in axial alignment. The bottom of the chute 52 discharges into a magazine 53 that is a substantially oblong structure arranged to support a plurality of the bushings 50 in vertical position and laterally abutting relation. The magazine 53 is mounted upon the bracket-like structure 24 at the bottom thereof, and is arranged in fore-and-aft direction in the central plane of the apparatus. The bushings 50 stand in single file in the magazine, with the bushing at the forward extremity of the magazine disposed in axial alignment with the aperture 30 in the structures 23, 24. The forward extremity of the magazine 53 is formed with an aperture 54 in the bottom thereof and aperture 55 in the top thereof, said apertures being in axial alignment with each other and with the sub-jacent aperture 30 aforementioned. The aperture 54 is of sufficient size to enable a bushing 50 to pass therethrough, and the aperture 55 is of proper size to admit a bushing-ejecting instrumentality presently to be described.

The bushing 50 at the forward end of the magazine 53 normally is prevented from dropping through the aperture 54 of the magazine by friction of the end wall of the magazine and the adjacent bushing 50, between which the end bushing is confined. To this end the file of bushings 50 in the magazine is yieldingly urged toward the forward end of the latter by a spring-pressed plunger 57 that is mounted in the magazine at the rear end thereof. The plunger 57 has a rounded nose, as shown in Figs. 4 and 5, and the amplitude of movement of the plunger is such that in its retracted position, shown in broken lines in Fig. 4, its nose is disposed rearwardly of the discharge end of chute 52 so as to enable a bushing 50 from the latter to drop into the magazine. In the projected position of the plunger 57, shown in full lines in Fig. 4, the plunger urges the file of bushings 50 toward the forward end of the magazine. The plunger is urged forwardly to projected position by means of a compression spring 58 positioned between the rear of the plunger and the rear closure plate 53ᵃ of the magazine 53. For retracting the plunger 57, against the force of the spring 58, a pull rod 59 is connected at its forward end to the plunger and extends rearwardly therefrom through the closure plate 53ᵃ, the rear end of the rod 59 being connected to mechanism, presently to be described, that effects operation of the plunger in determinate time relation to other instrumentalities of the apparatus.

The aperture in each disc 12 is smaller than the bushing 50 to be inserted therein and it is for this reason that the pilot 32 is provided, said pilot being mounted in the lower end of the bushing 50 while the latter is still in the magazine 53, at the forward end of the file of bushings therein. Subsequently a descending ejector plunger forces the bushing from the magazine and into the aperture in a disc 12, after which a second ejector plunger, operating through the mounted bushing, ejects the pilot 32 from the latter, said pilot dropping into the receptacle 28 positioned below top plate 21.

The ejector plunger that forces bushings 50 from the magazine 53 is a tubular structure 62 of substantially the same outside diameter as the said bushings, said plunger being removably mounted in the lower end of a larger tubular sleeve 63 that is journaled for vertical axial movement in an apertured ear 24a that projects forwardly from the structure 24. Mounted in the upper end of the sleeve 63 and extending upwardly therefrom is a tubular extension 64 of smaller diameter than sleeve 63, said extension being slidably mounted in an apertured ear 24b that projects from structure 24 in the same manner as ear 24a. Mounted upon the upper end portion of sleeve 63 is a collar 65 formed with laterally projecting lugs to which are pivotally connected one end of respective lever arms 66, 66, which arms are employed to effect axial reciprocation of the sleeve 63, as subsequently will be explained. For determinately limiting the downward movement of the sleeve 63, a pair of adjustable nuts 67 are threaded upon the upper end portion of extension 64 of said sleeve, the lowermost of said nuts being adapted to abut the top side of ear 24b when said sleeve is moved downwardly. The arrangement is such that the ejector plunger 62 may be moved from the inoperative, elevated position shown in Fig. 4 to the operative, depressed position shown in Fig. 5. Such movement carries the plunger through the magazine 53, by way of the aligned apertures 54, 55 in the latter, thereby ejecting a bushing 50 from the magazine, which bushing carries the pilot 32 for a purpose presently to be explained. The plunger 62 may be replaced by a plunger of different diameter when the work-discs 12 are to receive bushings 50 of different diameter.

Telescopically mounted for axial movement within the plunger 62, sleeve 63 and extension 64 is push rod 70 that has a rounded lower end projecting from the lower end of the plunger 62 in the inoperative position of the plunger. The function of the push rod 70 is to eject the pilot 32 from a bushing 50 after the latter has been inserted in a work-disc 12, as is shown in Fig. 5. For reciprocating the push rod relatively of the members in which it is mounted, a fluid pressure operated cylinder 71 is mounted atop the extension 64, coaxially therewith, said cylinder including the usual piston (not shown) to which the upper end of push rod 70 operatively is connected. The cylinder 71 is single-acting, pressure fluid for operating the same being admitted thereto and evacuated therefrom through a suitable conduit 72 having communication therewith through the upper end thereof. A suitable spring (not shown) interiorly of the cylinder 71 restores the push rod 70 to elevated position when pressure is withdrawn from the cylinder. The conduit 72 extends to a suitable source of pressure fluid (not shown), said conduit including a control valve 73 by which the admission of fluid to and evacuation from the cylinder 71 is controlled. The valve 73 is mounted upon one of the lever arms 66, as is best shown in Figs. 1 and 2, and moves with said arm. For actuating the valve in determinate time relation to movement of the arms 66, an operating roller 74 is mounted upon the side of structure 24 in position to be engaged by valve 73 when the lever arms 66 move the sleeve 63 to its lowermost position, the said valve being so constructed as to be opened by roller 74 to admit fluid to the cylinder 71, and to close and evacuate fluid from the cylinder when disengaged from said roller. The latter is mounted for vertical adjustment to compensate for adjustment of the lowermost position of plunger 62 through the agency of the nuts 67.

The lever arms 66 extend rearwardly from their connection with collar 65, and at their rear ends are pivotally connected to the upper ends of respective upstanding links 76 that are pivotally mounted at their lower ends upon respective brackets 77, the latter being mounted upon top plate 21 at each side of cylinder 43. The forward ends of the lever arms 66 are moved up and down to effect reciprocation of sleeve 63, during which movement said lever arms pivot about their connections with links 76 and the latter pivot to a minor extent upon their brackets 77. When the lever arms 66 are at the upper limit of their range of movement they bear against and appreciably lift an abutment structure 78 mounted on the under side of hopper 51, whereby the latter is reciprocated, by movement of said lever arms, to the end that bushings in the hopper readily pass into chute 52.

For moving the lever arms 66 up and down as described, respective operating rods or links 80 are connected thereto adjacent the forward ends thereof, said links extending downwardly therefrom through suitable guide means 81 on the structures 23 and 24, and through suitable apertures (not shown) in top plate 21, the lower ends of said links being connected to a yoke 82 in the lower part of the machine. Each link 80 is articulated at 83 to compensate for angular movement of the lever arm to which it is connected. The yoke 82 is mounted on the outer end of the piston rod 84 of a vertically positioned double-acting fluid pressure operated cylinder 85, which cylinder is mounted upon the shelf 22 in the lower part of the machine. It will be obvious that charging and discharging of cylinder 85 will operate the arms 66 in the manner described.

The rising and descending movement of yoke 82 also is utilized to raise and lower the pilot-receptacle 28 in determinate time-relation to the operation of other elements that are actuated by said cylinder 85. To this end the lower end portion of receptacle-spindle 27 is pivotally connected to a pair of short, parallel links 88, 88 that extend upwardly at each side of said spindle and have their upper ends pivotally connected to respective arms 89 that extend rearwardly therefrom, in parallelism, said arms being disposed in opposite sides of the piston rod 84. Near their rear ends the arms 89 are connected to each other by a transverse member 90, and at their rear ends they are pivotally connected at 91 to a bracket 92 that is mounted on the under side of top plate 21 and projects downwardly therefrom. Pivotally mounted on a horizontal axis upon the yoke 82, at the rear thereof, is a latch 93. The lower end portion of latch 93 extends between arms 89 immediately rearwardly of cross-piece 90, and is formed with a forwardly projecting nose or latching lug 94 adapted to engage under said cross-piece 90, and thereby to lift the arms 89 and spindle 27 whenever the yoke 82 is lifted by the piston rod 84. A tension spring 95 connected to latch 93 below its pivot point and to a fixed point on the yoke 82 normally urges the lower end of the latch toward said cross-piece 90.

The latch 93 is arranged to be disengaged from the cross-piece 90 automatically when the yoke 82 is elevated to its uppermost position, and to this end the said latch has its rear margin formed, at the upper end thereof, with a projecting cam surface 96, which surface is engageable with a cam roller 97 journaled in a bracket 98 that is mounted for vertical adjustment upon the front of bracket 92. The arrangement is such that when the cylinder 85 lowers the yoke 82 to lowermost position, the nose 94 of latch 93 will be drawn, by the spring 95, under the lower margin of cross-piece 90 of the arms 89. Then when cylinder 85 moves yoke 82 and latch 93 upwardly, said latch lifts the arms 89 about their pivots 91 and thereby elevates receptacle 28 and pilot 32 therein. As the receptacle 28 is moved upwardly, it passes through aperture 29 in top plate 21 and enters aperture 30 in the overhanging portions of structures 23, 24, and the stem 33 of the pilot 32 in said receptacle passes through aperture 54 in the bottom of magazine 53 and enters the bore of the foremost bushing 50 of the file of bushings in said magazine, as is best shown in broken lines in Fig. 4, the detent 34 of the pilot-stem frictionally engaging the bore of the bushing. The cam roller 97 is so positioned that as the yoke 82 reaches its upper limit of movement, and the pilot-stem is inserted in a bushing as described, the cam surface 96 of the latch 93 engages said cam roller with the result that the said latch is tilted on its pivot from the position shown in broken lines in Fig. 8 to the position shown in full lines therein. This withdraws the nose 94 at the other end of the latch from latching engagement with cross piece 90 of the arms 89, thereby allowing the latter to drop to the position shown in Figs. 1 and 2 and lowering the receptacle 28, the pilot 32 however, remaining suspended from the bushing 50 by reason of the engagement of its detent 34 with the bore of the bushing. It will be understood that the operations described take place while there is no disc 12 in operative position abutting stops 36, 37. A collar 100 is adjustably mounted on the spindle 27 and slides within the bore of bearing portion 26, which bore is reduced at its lower end whereby the position of said collar limits the downward movement of the spindle 27 and parts connected thereto, and determines the inoperative position of receptacle 28.

Mounted upon the top of the magazine 53 is a springbacked keeper 102 that projects somewhat over the aperture 55 in the top thereof. The purpose of said keeper is to prevent a bushing 50 from being pushed upwardly through said aperture while the stem 33 of the pilot 32 is being inserted into the bushing from the lower end thereof. The keeper is so shaped that it will be pushed aside by the ejector plunger 62 when the latter descends to eject a bushing from the magazine 53.

The pivotal movement of the arms 66, which effects the lifting and lowering movement of the ejector plunger 62 as hereinbefore described, also is utilized for reciprocating the magazine plunger 57 in determinate time-relation to the operation of said ejector plunger. To this end respective fingers 104, 104 are attached to the arms 66 and extend downwardly therefrom a short distance in front of the links 76 upon which said arms are pivoted. The free ends of fingers 104 between them carry a slide block 105 that is journaled in slots in the respective fingers so as to have angular movement in the fingers and limited movement longitudinally thereof. The pull rod 59 of the magazine plunger 57 extends slidably through the block 105, and helical compression springs 106, 106 are mounted on the pull rod at each side of block 105, said springs being confined between said block and respective collars 107 mounted upon the pull rod. The arrangement is such as to provide a yielding pull for the pull rod 59 so that no adjustment thereof is required to compensate for variations in the extent of movement of the arms 66 as determinated by the adjustment of the nuts 67.

The machine is entirely automatic in operation, and is operated by air at super-atmospheric pressure. Air under pressure from a suitable source of supply thereof (not shown) reaches the machine through pipe or conduit 110, Fig. 7. From pipe 110 a branch pipe 111 extends upwardly to a pressure reducer device 112, the latter discharging into a three-way valve 113 that is mounted upon the standard 20, somewhat below the top plate 21. From valve 113 a pipe 114 extends to the rear end of fluid pressure cylinder 43 to supply thereto the air that operates said cylinder. The valve 113 comprises an operating lever 115 which, when depressed, opens the valve to enable air under pressure to pass to cylinder 43 to charge the latter. When the lever 115 is released, the valve closes and discharges the air from the cylinder 43.

Figures 7, 8:
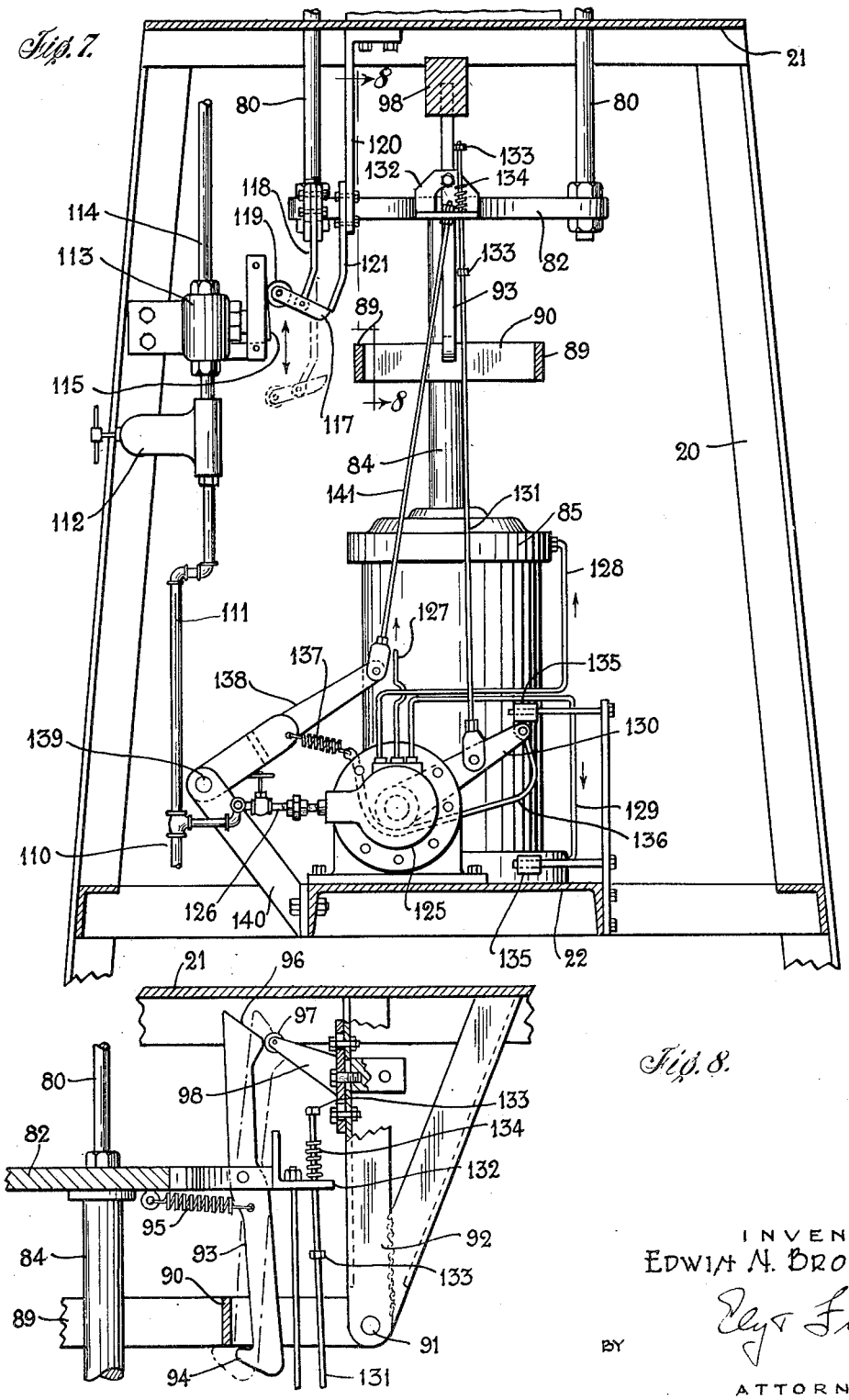
Fig. 7 is a section on the line 7—7 of Fig. 3.
Fig. 8 is a section on the line 8—8 of Fig. 7.

The operating of valve 113 is effected automatically in determinate time relation to the operation of other instrumentalities of the machine, and to this end an operating finger 117 is provided. The finger 117 is a lever-like member that is pivoted substantially midway between its ends upon the lower end of an adjustable bracket arm 118 that is carried by the yoke 82, as is best shown in Fig. 7. One end of finger 117 has a roller 119 journaled therein, which roller is adapted to engage lever 115 of valve 113, as presently will be explained. Secured to the under side of top plate 21 and extending downwardly therefrom is a bracket 120 and adjustably mounted on the lower end thereof is a stop-plate 121 that projects into the path of the finger 117 at the opposite end thereof from the roller 119. The position of the lower end of the stop 121 is such that the finger 117 engages the same during the time that the yoke 82 is rising to swing the roller 119 against lever 115 and thereby to operate and open valve 113. During descent of the yoke 82, plate 121 swings finger 117 in the direction that moves roller 119 away from valve-lever 115.

Since the bracket arm 118 and stop plate 121 are adjustably mounted, it is possible to effect operation of the valve 113 in determinate time relation to operation of other instrumentalities of the machine during a cycle of operation. Actually the roller 119 engages the valve-lever 115 and opens valve 113 shortly after the yoke 82 starts its rising movement. When the said yoke first starts to rise the valve 73 on arm 66 moves off roller 74, thus discharging cylinder 71 and causing push rod 70 to be withdrawn from bushing 50 of the finished work. Rising movement of the arms 66 also lifts tubular structure 62 out of engagement with said bushing 50 of the finished work. It is at this time the rear end of finger 117 engages stop plate 121 and is turned on its pivot so that roller 119 moves in an arc and engages valve-lever 115 of valve 113 to depress said lever and open said valve. This effects the charging of the rear end of cylinder 43 with the result that its piston rod is projected outwardly and the push rods 42 moved forwardly to displace the finished work from its operative position on the top plate 21, the said work falling by gravity into the receptacle 41. The roller 119 remains operatively engaged with the valve lever 115 for an appreciable interval of time as the yoke 82 continues to rise.

Figure 6:
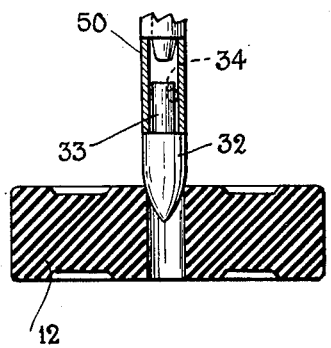
Fig. 6 is a fragmentary sectional detail view showing the bushing, with pilot therein, as the latter moves into engagement with the article.

At about the time the cylinder 43 is charged, the nose of latch 93, which is being moved upwardly by yoke 82, engages transverse member 90 of arms 89, to lift the latter and thereby to elevate the receptacle 23 with pilot 32 therein. The stem 33 of the latter moves into the bore of the bushing 50 that is located at the forward end of the file of bushings in magazine 53, said stem frictionally engaging said bore by reason of the detent 34, so that the pilot will remain in association with said bushing, as shown in Fig. 6, when said receptacle subsequently is lowered. As the yoke 82 approaches the uppermost limit of its movement, the cam surface 96 on the upper end of latch 93 engages cam roller 97, the latch is tilted to the position shown in broken lines in Fig. 8, and the arms 89 thus released drop to the position shown in Figs. 1 and 2, thus lowering receptacle 28, as previously has been explained. At substantially the same time the roller 119 reaches the position shown in full lines in Fig. 7 wherein it no longer holds the lever 115 of valve 113 in depressed position. The latter then automatically closes and effects the discharge of cylinder 43, whereupon tension springs 46 retract push rods 42, thus enabling the file of discs 12 in chute 18 to move downwardly until stopped by engagement of the disc at the forward end of the file with the abutment members 36 and 37. Upward movement of the yoke 82 is arrested by engagement of the collar 65 with ear 24b.

As previously stated, the yoke 82 is raised and lowered by the double-acting fluid pressure operated cylinder 85, and such raising and lowering is effected automatically and continuously by valve means, the operation of which is controlled by the yoke 82. To this end a four-way valve 125 is provided, which valve is mounted upon the shelf 22 of the standard 20. As is best shown in Fig. 7, the valve 125 has an inlet connection 126 with pipe 110 that carries air at super-atmospheric pressure, an exhaust pipe 127, an inlet-and-outlet pipe 128 extending from the valve to the upper end of cylinder 85, and an inlet-and-outlet pipe 129 extending to the lower end of cylinder 85. The arrangement is such that when one end of the cylinder 85 is charged the opposite end is discharged. The valve 125 is provided with an operating arm 130, and the latter has a lost motion connection with the yoke 82 through the agency of a link or rod 131 that extends freely through an aperture formed in an angle bracket 132 that is attached to the rear of said yoke. Nuts 133, 133 are mounted upon rod 131 in spaced-apart relation above and below bracket 132, and a compression spring 134 is mounted upon said rod between the bracket 132 and uppermost nut 133. Adjustable abutments 135, 135 are provided for limiting the operating movement of the arm 130 in either direction. It is desirable that the operating arm 130 move rapidly from one operative position to the other, and to this end a bowed, strap-like structure 136 is connected to the arm 130 and at its other end is connected to one end of a tension spring 137, the intermediate region of said structure engaging the hub portion of arm 130. The other end of spring 137 is connected to an arm 138 that is pivotally mounted at 139 upon a bracket 140 secured to shelf 22. A link 141 connects the free end of arm 138 to bracket 132 on yoke 82. The arrangement is such that up and down movement of the yoke swings the spring 137 over center so that when the valve-operating arm 130 subsequently is turned angularly by movement of the rod 131, it quickly snaps to its extremity of movement, against one of the abutments 135. This reverses the valve 125 and causes the cylinder 85 to move its piston rod 84 in the opposite direction.

In the operation of the machine, the magazine 53, chute 52, and hopper 51 are supplied with metal bushings 50. The annular discs 12 of rubber composition first are heated to soften the composition, and then are dumped into the hopper 11 which feeds them into the chute 18, the leading disc of the file thereof being accurately positioned at the assembling station of the machine by abutments 36, 37. Assuming that a pilot 32 is mounted in the bushing 50 at the forward end of the file thereof, and that the yoke 82 is in elevated position as shown in the drawings, operation of the machine is initiated by admitting air under pressure thereto through pipe 119. As the upper end of cylinder 85 is charged and moves the yoke 82 downwardly, the links 80 swing the free ends of arms 66 downwardly and the plunger 62 actuated thereby ejects the foremost bushing 50 from the magazine 53. The pilot 32 projecting from the lower end of said bushing enters the axial aperture of disc 12 positioned therebelow, as shown in Fig. 6, and the descending plunger 62 forces said pilot completely through said disc, the bushing 50 following the pilot and thus being positioned within the axial aperture of the disc. The latter being warm, is distended slightly as the pilot passes therethrough, but contracts quickly so as frictionally to grip the bushing. As the arms 66 reach the limit of their descent, valve 73 thereon engages abutment 74 and is opened to effect charging of cylinder 71. This projects push rod 70 which ejects pilot 32 from bushing 50 in disc 12, said pilot dropping into receptacle 28 positioned therebeneath, as shown in Fig. 5. As the yoke 82 reaches its lowermost limit of travel it reverses valve 125 and effects charging of the lower end of cylinder 85, thus initiating rising movement of the yoke.

The first result of such rising movement of the yoke is to lift the arms 66, thus moving valve 73 away from abutment 74. This discharges cylinder 71 and withdraws push rod 70 from the work. Such lifting of the arms 66 also withdraws plunger 62 from the work. Next the finger 117 is tilted to operate valve-lever 115 to open valve 113, which results in the charging of cylinder 43 and the projecting of push rods 42 to eject the finished work from the assembling station, the push rods remaining in projected position and thus preventing the succeeding disc 12 from moving to the assembling station. In the meantime the rising arms 66 swing the fingers 104 thereon in the direction that projects the pull rod 59 forwardly, thus forcing a bushing 50 in the magazine 53 to the forward extremity of the latter. At this time the rising yoke 82 has lifted the latch 93 sufficiently for the nose 94 on the lower end thereof to engage cross-piece 90 of the arms 89, with the result that receptacle 28 is lifted to insert stem 33 of pilot 32 into the bore of the foremost bushing 50 in magazine 53, as previously has been explained. The receptacle 28 drops to its lowermost position when the latch 93 is tilted by reason of the engagement of its upper end with cam roller 97, as shown in full lines in Fig. 8, which occurs when the yoke 82 reaches substantially the upper limit of its movement. Next, the finger 117 moves out of engagement with valve 113, enabling the latter to close and thus exhaust cylinder 43, the springs 46 thereupon retracting push rods 42 and permitting a disc 12 to move to the assembling station of the machine.

This completes a cycle of operation, and as the yoke 82 reaches its extreme uppermost position it effects the turning of valve-arm 130 to reverse valve 125, thus charging the upper end of cylinder 85 while discharging the lower end thereof whereby another cycle of operation automatically is initiated.

The invention is automatic in its operation, effects savings of time and labor in performing its intended functions, and achieves the other advantages set out in the foregoing statement of objects.

Modification may be resorted to without departing from the spirit of the invention or the scope thereof as defined by the appended claims.

What is claimed is:

1. A machine for inserting tubular metal bushings in axial apertures of non-metallic discs comprising means for presenting said discs in succession at an assembly station, said first-mentioned means including an elevated rotary hopper adapted to receive in chance arrangement a multiplicity of said discs, a slot at the bottom of said hopper of such size that said discs escape in single order therefrom, an inclined conveyor chute having one end adjacent said hopper and extending downwardly therefrom to said assembly station, a disc-escape opening in said rotary hopper communicating with said chute, said chute being adapted to receive said discs after they have escaped from said hopper and to guide them by gravity in succession to said station, a magazine disposed above said station, said magazine being adapted to hold a multiplicity of said bushings disposed in file formation with the leading bushing of said file and said disc at said station being in axial alignment, an elevated vibratory hopper adapted to receive in chance arrangement a multiplicity of said bushings, a downwardly inclined discharge chute communicating with an opening in the bottom of said vibratory hopper, said discharge chute being adapted to receive said bushings in axial alignment and to convey them by gravity to said magazine, a fluid-operated ejector plunger having a fluid pressure cylinder mounted on said machine in axial alignment with said disc and bushing at said station and being adapted for vertical movement whereby said leading bushing is forced downwardly into the axial apertures of said discs.

2. A machine as defined in claim 1 wherein said ejector plunger is hollow, a push-rod telescoped therein, said push-rod being connected with a piston of said cylinder for projecting the push rod from the lower end thereof, and means comprising a series of automatically operated valves for controlling the operation of said fluid pressure cylinder in determinate time relation to the movement of the plunger.

3. A machine for inserting tubular metal bushings in axial apertures of non-metallic discs comprising means for presenting said discs in succession at an assembly station, said first-mentioned means including an elevated rotary hopper adapted to receive in chance arrangement a multiplicity of said discs, a slot at the bottom of said hopper of such size that said discs escape in single order therefrom, an inclined conveyor chute having one end adjacent said hopper and extending downwardly therefrom to said assembly station, a disc-escape opening in said rotary hopper communicating with said chute, said chute being adapted to receive said discs after they have escaped from said hopper and to guide them by gravity in succession to said station, a magazine disposed above said station, said magazine being adapted to hold a multiplicity of said bushings disposed in file formation with the leading bushing of said file and said disc at said station being in axial alignment, an elevated vibratory hopper adapted to receive in chance arrangement a multiplicity of said bushings, a downwardly inclined discharge chute communicating with an opening in the bottom of said vibratory hopper, said discharge chute being adapted to receive said bushings in axial alignment and to convey them by gravity to said magazine, a fluid-operated ejector plunger having a fluid pressure cylinder mounted on said machine in axial alignment with said disc and bushing at said station and being adapted for vertical movement whereby said leading bushing is forced downwardly into the axial apertures of said discs, a pair of reciprocable fluid pressure operable off-set push rods for ejecting the assembled bushing and disc from the assembled station, said off-set rods being spaced apart to permit passage of a pilot therebetween and being disposed across the path of travel of succeeding discs towards said station during said ejecting operation.

EDWIN N. BRODEN.

REFERENCES CITED

The following references are of record in the file of this patent:

UNITED STATES PATENTS

| Number | Name | Date |
|---|---|---|
| 553,221 | Church | Jan. 14, 1896 |
| 1,524,978 | Kirk | Feb. 3, 1925 |
| 1,729,843 | Reich | Oct. 1, 1929 |
| 1,739,270 | Thiry | Dec. 10, 1929 |
| 1,856,440 | Spire | May 3, 1932 |
| 1,888,642 | Tryon | Nov. 22, 1932 |
| 1,890,300 | Nagele | Dec. 6, 1932 |
| 1,913,933 | Lamborn | June 13, 1933 |
| 1,959,254 | Zerk | Mar. 15, 1934 |
| 2,110,783 | Welker | Mar. 8, 1938 |
| 2,125,707 | Anderson | Aug. 2, 1938 |
| 2,296,964 | Ushakoff | Sept. 29, 1942 |
| 2,343,420 | Podesta | Mar. 7, 1944 |
| 2,347,780 | Hermanns | May 2, 1944 |
| 2,379,508 | Dodge | July 3, 1945 |